United States Patent
Lee

(10) Patent No.: US 9,868,422 B2
(45) Date of Patent: Jan. 16, 2018

(54) CONTROL APPARATUS OF BRAKE SYSTEM AND METHOD OF CONTROLLING THE SAME

(71) Applicant: MANDO CORPORATION, Pyeongtaek-Si (KR)

(72) Inventor: Woong-Ki Lee, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/043,316

(22) Filed: Feb. 12, 2016

(65) Prior Publication Data

US 2016/0244037 A1    Aug. 25, 2016

(30) Foreign Application Priority Data

Feb. 13, 2015    (KR) .......................... 10-2015-0021947

(51) Int. Cl.
*G06F 7/70* (2006.01)
*B60T 8/17* (2006.01)
(Continued)

(52) U.S. Cl.
CPC .............. *B60T 8/1708* (2013.01); *B60T 7/12* (2013.01); *B60T 8/885* (2013.01); *B60T 13/662* (2013.01);
(Continued)

(58) Field of Classification Search
CPC .......... B60T 8/1708; B60T 7/12; B60T 8/248; B60T 8/885; B60T 13/662; B60T 2230/06; B60T 2270/402
(Continued)

(56) References Cited

U.S. PATENT DOCUMENTS 8,983,729 B2 * 3/2015 Hahne .................. B60T 8/1708
701/42
2004/0073351 A1 * 4/2004 Haberhauer ............ B60T 8/172
701/70
(Continued)

FOREIGN PATENT DOCUMENTS

DE    10326190 A1    12/2004
DE    102009011907 A1    9/2010
(Continued)

OTHER PUBLICATIONS

German Office Action dated Nov. 10, 2016 issued in German Patent Application No. 102016201891.4.
(Continued)

*Primary Examiner* — Shardul D Patel
(74) *Attorney, Agent, or Firm* — McDermott Will & Emery LLP

(57) ABSTRACT

A control apparatus and a method of a brake system include an input unit receiving a connection signal on a connection between a vehicle and a trailer sensed by a sensing apparatus and receives current yaw rate error information of the vehicle according to current oscillation information of the trailer, a determination unit determining whether the vehicle and the trailer are mutually connected based on the connection signal, and a control unit selecting target yaw rate information preset while being divided for each type and weight of the trailer depending on the connection of the trailer to reduce a yaw rate error rate with respect to the current yaw rate error information of the vehicle according to the current oscillation information and transmitting a brake command to the brake system to brake the vehicle according to the selected corresponding target yaw rate information.

16 Claims, 12 Drawing Sheets

(51) Int. Cl.
*B60T 8/88* (2006.01)
*B60T 7/12* (2006.01)
*B60T 13/66* (2006.01)

(52) U.S. Cl.
CPC ..... *B60T 2230/06* (2013.01); *B60T 2270/402* (2013.01)

(58) Field of Classification Search
USPC ......... 701/36, 37, 41, 51, 70, 79; 188/112 A
See application file for complete search history.

(56) References Cited

U.S. PATENT DOCUMENTS

| | | | | |
|---|---|---|---|---|
| 2006/0244579 | A1* | 11/2006 | Raab | B60T 8/1708 340/438 |
| 2009/0093928 | A1* | 4/2009 | Getman | B60T 8/1755 701/37 |
| 2009/0228182 | A1* | 9/2009 | Waldbauer | B60T 8/1708 701/70 |
| 2011/0029210 | A1* | 2/2011 | Wu | B60D 1/30 701/70 |
| 2013/0190989 | A1* | 7/2013 | Hahne | B60T 8/1708 701/42 |
| 2014/0180555 | A1* | 6/2014 | Eckert | B60T 8/1708 701/79 |
| 2014/0222288 | A1* | 8/2014 | Lavoie | G06F 17/00 701/41 |
| 2016/0159347 | A1* | 6/2016 | Lavoie | B60W 10/18 701/41 |

FOREIGN PATENT DOCUMENTS

| | | |
|---|---|---|
| DE | 102012000784 A1 | 7/2013 |
| DE | 102012222993 A1 | 6/2014 |
| JP | 2004517005 A | 6/2004 |
| JP | 2011031881 A | 2/2011 |
| KR | 10-0592518 B1 | 6/2006 |
| KR | 10-2009-0100018 A | 9/2009 |
| WO | 2014/094944 A1 | 6/2014 |

OTHER PUBLICATIONS

Korean Notice of Patent Allowance issued in Korean Patent Application No. 10-2015-0021947 (English translation).

* cited by examiner

FIG. 3
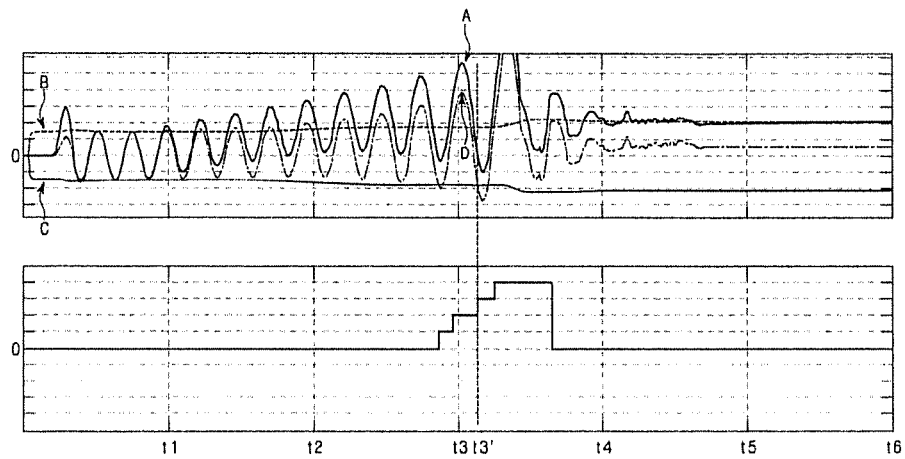
FIG. 4
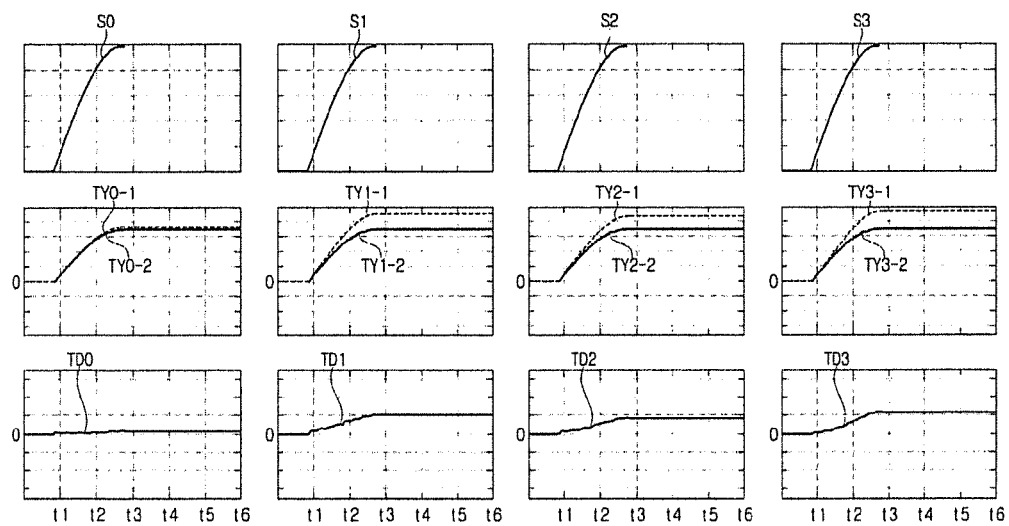
FIG. 4A
WHEN TRAILER
IS NOT
MOUNTED
FIG. 4B
WHEN FIRST
TRAILER IS
MOUNTED
FIG. 4C
WHEN FIRST
TRAILER WITH
DIFFERENT
WEIGHT IS
MOUNTED
FIG. 4D
WHEN SECOND
TRAILER OF
DIFFERENT TYPE IS
MOUNTED

CONTROL APPARATUS OF BRAKE SYSTEM AND METHOD OF CONTROLLING THE SAME

CROSS-REFERENCE TO RELATED APPLICATION

This application claims the benefit of Korean Patent Application No. 10-2015-0021947, filed on Feb. 13, 2015 in the Korean Intellectual Property Office, the disclosure of which is incorporated herein by reference.

BACKGROUND

1. Field

Embodiments of the present invention relate to a control apparatus of a brake system and a method of controlling the same.

2. Description of the Related Art

Generally, trailers are provided to be connected to a vehicle to transport loads or people without power.

However, in conventional brake systems, when a vehicle and a trailer turn while being mutually connected, since a center of gravity (CG) point and weight of the vehicle change, it is limited to stably brake the vehicle depending on current oscillation information of the trailer. Accordingly, there is a limit in preventing the occurrence of traffic accidents.

Accordingly, recently, an improved control apparatus of a brake system and a method of controlling the same, capable of preventing the occurrence of traffic accidents by stably braking a vehicle according to current oscillation information of a trailer when the vehicle and the trailer turn while being mutually connected, have been continuously researched.

Also, recently, an improved control apparatus of a brake system and a method of controlling the same, capable of further preventing the occurrence of traffic accidents by inducing at least one of driving in concentration and driving with caution of a driver, have been continuously researched.

SUMMARY

Therefore, it is an aspect of the present invention to provide a control apparatus of a brake system and a method of controlling the same, capable of preventing the occurrence of traffic accidents.

It is another aspect of the present invention to provide a control apparatus of a brake system and a method of controlling the same, capable of further preventing the occurrence of traffic accidents by inducing driving in concentration.

It is still another aspect of the present invention to provide a control apparatus of a brake system and a method of controlling the same, capable of further preventing the occurrence of traffic accidents by inducing driving with caution.

Additional aspects of the invention will be set forth in part in the description which follows and, in part, will be obvious from the description, or may be learned by practice of the invention.

In accordance with one aspect of the present invention, a control apparatus of a brake system includes an input unit which receives a connection signal on a connection between a vehicle and a trailer sensed by a sensing apparatus and receives current yaw rate error information of the vehicle according to current oscillation information of the trailer sensed by the sensing apparatus, a determination unit which determines whether the vehicle and the trailer are mutually connected based on the connection signal, and a control unit, when the vehicle and the trailer are mutually connected, which selects target yaw rate information preset while being divided for each type and weight of the trailer depending on the connection of the trailer to reduce a yaw rate error rate with respect to the current yaw rate error information of the vehicle according to the current oscillation information and transmits a brake command to the brake system to brake the vehicle according to the selected corresponding target yaw rate information.

The control unit, when the target yaw rate information is selected, may transmit the brake command to the brake system in advance to shorten a control time point of the brake system.

The input unit may receive the current yaw rate error information of the vehicle according to the current oscillation information of the trailer when the vehicle and the trailer turn.

The control apparatus may further include a first identification unit which identifies that the vehicle and the trailer are mutually connected.

The control apparatus may further include an image photographing unit which photographs a rear of the vehicle. Here, when the trailer is photographed by the image photographing unit, the determination unit may determine that the vehicle and the trailer are mutually connected.

The control apparatus may further include a second identification unit which identifies that a current yaw rate corresponds to an error situation when the current yaw rate error information of the vehicle according to the current oscillation information of the trailer is received.

The control apparatus may further include a third identification unit which identifies a reduction of an error situation of a current yaw rate when the target yaw rate information is selected.

The control apparatus may further include a fourth identification unit which identifies that the vehicle is braked while reducing an error situation of a current yaw rate when the brake command is transmitted to the brake system.

In accordance with another aspect of the present invention, a method of controlling a brake system includes a first input operation of receiving a connection signal on a connection between a vehicle and a trailer sensed by a sensing apparatus, a determination operation of determining whether the vehicle and the trailer are mutually connected based on the connection signal, a second input operation of receiving current yaw rate error information of the vehicle according to current oscillation information of the trailer sensed by the sensing apparatus when the vehicle and the trailer are mutually connected, a selection operation of selecting target yaw rate information preset while being divided for each type and weight of the trailer depending on the connection of the trailer to reduce a yaw rate error rate with respect to the current yaw rate error information of the vehicle according to the current oscillation information, and a driving operation of transmitting a brake command to the brake system to brake the vehicle according to the selected corresponding target yaw rate information.

When the target yaw rate information is selected, the driving operation may include transmitting the brake command to the brake system in advance to shorten a control time point of the brake system.

The second input operation may include receiving the current yaw rate error information of the vehicle according to the current oscillation information of the trailer when the vehicle and the trailer turn.

The method may further include a first identification operation of identifying that the vehicle and the trailer are mutually connected when the vehicle and the trailer are mutually connected.

The method may further include a second identification operation of identifying that a current yaw rate corresponds to an error situation when the current yaw rate error information of the vehicle according to the current oscillation information of the trailer is received.

The method may further include a third identification operation of identifying a reduction of an error situation of a current yaw rate when the target yaw rate information is selected.

The method may further include a fourth identification operation of identifying that the vehicle is braked while reducing an error situation of a current yaw rate when the brake command is transmitted to the brake system.

The method may further include photographing a rear of the vehicle. Here, when the trailer is photographed, it may be determined that the vehicle and the trailer are mutually connected.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 is a waveform diagram illustrating current yaw rate error information and current yaw rate information of a vehicle according to current oscillation information of a trailer sensed by the sensing apparatus of FIGS. 1 and 2, preset reference yaw rate error range information, and a point in time of controlling of the brake system;

FIGS. 4(*a*) to 4(*d*) are graphs illustrating target yaw rate information which includes reference yaw rate information in comparison with the current yaw rate information for each piece of steering information in which steering is performed according to a type and a weight of the trailer provided to a control unit of FIG. 2;

DETAILED DESCRIPTION

Hereinafter, embodiments of the present invention will be described in detail with reference to the drawings. The following embodiments are provided to completely convey the concept of the present invention to a person of ordinary skill in the art. The present invention is not limited to the embodiments described below and may be embodied in other forms. Throughout the drawings, for clarity, parts irrelevant to a description will be omitted and sizes of components may be slightly exaggerated for better understanding.

Figure 1:
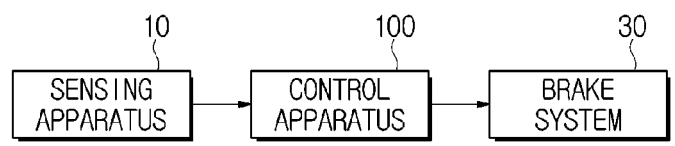
FIG. 1 is a block diagram illustrating a state in which a control apparatus is connected to a sensing apparatus and a brake system in accordance with a first embodiment of the present invention.
Figure 2:
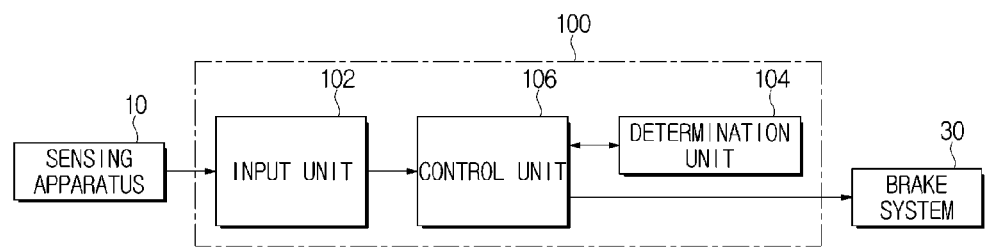
FIG. 2 is a block diagram illustrating an example of the control apparatus of the brake system of FIG. 1.

FIG. 1 is a block diagram illustrating a state in which a control apparatus is connected to a sensing apparatus and a brake system in accordance with a first embodiment of the present invention. FIG. 2 is a block diagram illustrating an example of the control apparatus FIG. 1.

FIG. 3 is a waveform diagram illustrating current yaw rate error information and current yaw rate information of a vehicle according to current oscillation information of a trailer sensed by the sensing apparatus of FIGS. 1 and 2, preset reference yaw rate error range information, and a point in time of controlling of the brake system.

Figure 5:
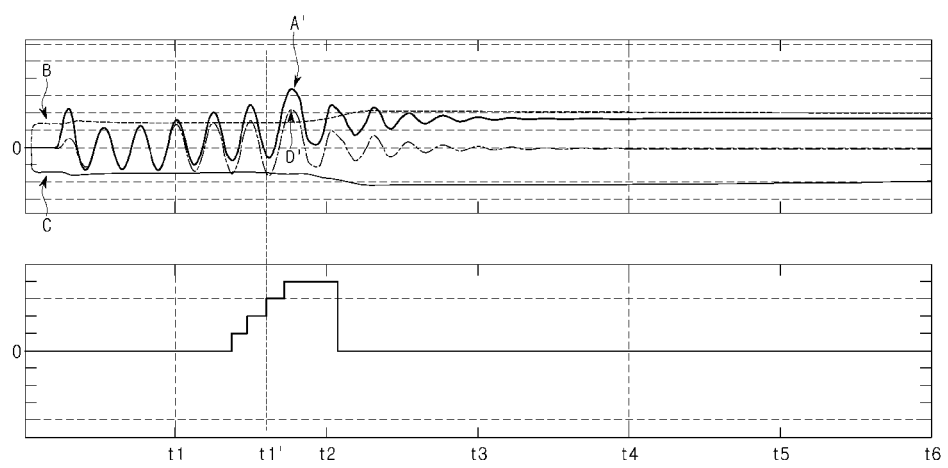
FIG. 5 is a waveform diagram illustrating the current yaw rate information, the reference yaw rate error range information, and the point in time of controlling of the brake system using the target yaw rate information provided to the control unit of FIG. 2.

FIGS. 4(*a*) to 4(*d*) are graphs illustrating target yaw rate information which includes reference yaw rate information in comparison with the current yaw rate information for each piece of steering information in which steering is performed according to a type and a weight of the trailer provided to a control unit of FIG. 2. FIG. 5 is a waveform diagram illustrating the current yaw rate information, the reference yaw rate error range information, and the point in time of controlling of the brake system using the target yaw rate information provided to the control unit of FIG. 2.

Referring to FIGS. 1 to 5, a control apparatus 100 in accordance with a first embodiment of the present invention includes an input unit 102, a determination unit 104, and a control unit 106.

The input unit 102 receives a connection signal on a connection between a vehicle and a trailer, sensed by a sensing apparatus 10, and receives current yaw rate error information D of the vehicle according to current oscillation information sensed by the sensing apparatus 10.

Here, the current oscillation information of the trailer may be information on oscillations caused by an external environmental factor such as wind, etc. or an internal factor of the trailer.

Here, the current yaw rate error information D may be calculated based on current yaw rate information A sensed by the sensing apparatus 10 and preset reference yaw rate error range information B and C.

For example, the reference yaw rate error range information B may be +yaw rate error threshold information and the reference yaw rate error range information C may be −yaw rate error threshold information.

Since receiving a lateral force in a direction of an outside of a turning reference circle in a turning situation, the current yaw rate information A described above is further biased outside. The current yaw rate error information D is biased based on 0 in a current situation.

Also, in the case of a control time point t3' of a brake system 30, since the current yaw rate error information D exceeds only a level of the +yaw rate error threshold information but keeps less than the −yaw rate error threshold information, it may be known that current oscillations are not initially sensed and a control operation is performed after much more pieces of the current yaw rate error information D occur.

Here, the input unit 102 may receive the current yaw rate error information D of the vehicle according to the current oscillation information of the trailer while turning around.

For example, the input unit 102 may receive the current yaw rate error information D of the vehicle according to the current oscillation information of the trailer while turning around of 100 kph 10 deg.

Here, although not shown in the drawings, the sensing apparatus 10 may be a trailer connector (not shown) which outputs a connection signal on a connection between the vehicle and the trailer but is not limited thereto and may be all sensors (not shown) for sensing the connection signal on the connection between the vehicle and the trailer.

Also, although not shown in the drawings, the sensing apparatus 10 may include a yaw rate sensor (not shown) for sensing the current yaw rate information to output the current yaw rate error information but is not limited thereto and may be all sensors (not shown) for sensing the current yaw rate information to output the current yaw rate error information.

Also, although not shown in the drawings, the control apparatus of the brake system in accordance with one embodiment of the present invention may include an image photographing unit (not shown) which photographs a rear of the vehicle.

The image photographing unit may photograph the rear of the vehicle to check whether a shape of the trailer is sensed in the rear for a certain time.

That is, when the shape of the trailer is sensed in a certain position in the rear for the certain time, a signal which includes corresponding image information may be transmitted to the determination unit 104.

The determination unit 104 determines whether the vehicle and the trailer are mutually connected based on the connection signal on the connection between the vehicle and the trailer sensed by the sensing apparatus 10.

Additionally, when the shape of the trailer is sensed by the image photographing unit, the determination unit 104 may determine whether the trailer is connected to the rear of the vehicle based on a signal which includes received image information.

When the determination unit 104 determines that the vehicle and the trailer are mutually connected, the control unit 106 selects target yaw rate information preset while divided for each type and weight of the trailer depending on a connection of the trailer to decrease a yaw rate error rate with respect to the current yaw rate error information D of the vehicle according to the current oscillation information.

For example, as shown in FIGS. 4(a) to 4(d), the target yaw rate information may be reference yaw rate information TY0-2, TY1-2, TY2-2, and TY3-2 in comparison with current yaw rate information TY0-1, TY1-1, TY2-1, and TY3-1 for each piece of steering information S0, S1, S2, and S3 in which steering is performed according to the type and weight of the trailer.

Here, FIG. 4(a) may be the reference yaw rate information TY0-2 in comparison with the current yaw rate information TY0-1 for the steering information S0 when the trail is not mounted.

Here, current yaw rate error information TD0 may be calculated based on the current yaw rate information TY0-1 and the reference yaw rate information TY0-2.

Also, FIG. 4(b) may be the reference yaw rate information TY1-2 in comparison with the current yaw rate information TY1-1 for the steering information S1 when a first trailer among trailer types is mounted in a turning situation of 100 kph 10 deg.

Here, current yaw rate error information TD1 may be calculated based on the current yaw rate information TY1-1 and the reference yaw rate information TY1-2.

Also, FIG. 4(c) may be the reference yaw rate information TY2-2 in comparison with the current yaw rate information TY2-1 for the steering information S2 when the first trailer with a different weight is mounted in the turning situation of 100 kph 10 deg.

Here, current yaw rate error information TD2 may be calculated based on the current yaw rate information TY2-1 and the reference yaw rate information TY2-2.

Also, FIG. 4(d) may be the reference yaw rate information TY3-2 in comparison with the current yaw rate information TY3-1 for the steering information S3 in a second trailer of which type is different from the first trailer is mounted in the turning situation of 100 kph 10 deg.

Here, current yaw rate error information TD3 may be calculated based on the current yaw rate information TY3-1 and the reference yaw rate information TY3-2.

Also, the control unit 106 transmits a brake command to the brake system 30 to brake the vehicle according to selected corresponding target yaw rate information.

The target yaw rate information described above, as shown in FIG. 5, may decrease in a yaw rate error rate of current yaw rate error information D' calculated based on current yaw rate information A' sensed by the sensing apparatus 10 and the reference yaw rate error range information B and C.

Accordingly, a control time point t1' of the brake system 30 using the target yaw rate information shown in FIG. 5 is more shortened than the control time point t3' of the brake system 30 according to the current oscillation information of the trailer shown in FIG. 3.

That is, since the current yaw rate error information D is not biased in the control time point t1' of the brake system 30 using the target yaw rate information shown in FIG. 5, it may be checked that the control time point t1' is more quickly shortened than the control time point t3' of the brake system 30 according to the current oscillation information of the trailer shown in FIG. 3.

Also, when the target yaw rate information is selected, the control unit 106 transmits a brake command to the brake system 30 in advance to shorten the control time point t1' of the brake system 30.

Here, although not shown in the drawings, the input unit 102, the determination unit 104, and the control unit 106 may be provided in a general electric control unit (ECU, not shown) which is a main computer applied to a vehicle to control, input, and determine the overall operations.

Also, although not shown in the drawings, the input unit 102, the determination unit 104, and the control unit 106 may be provided in a general micro control unit (MCU, not shown) which includes a processor, a memory, and input/output devices in a single chip to control, input, and determine the overall operations.

Also, the input unit 102, the determination unit 104, and the control unit 106 are not limited thereto and all controllers, input units, and determination units capable of controlling, inputting, and determining the overall operations of a vehicle may be available.

Here, the input unit 102, the determination unit 104, and the control unit 106 may be integrally provided or may be separately provided in the ECU or MCU.

A method of controlling the brake system 30 using the control apparatus 100 in accordance with the first embodiment of the present invention described above will be described with reference to FIG. 6.

Figure 6:
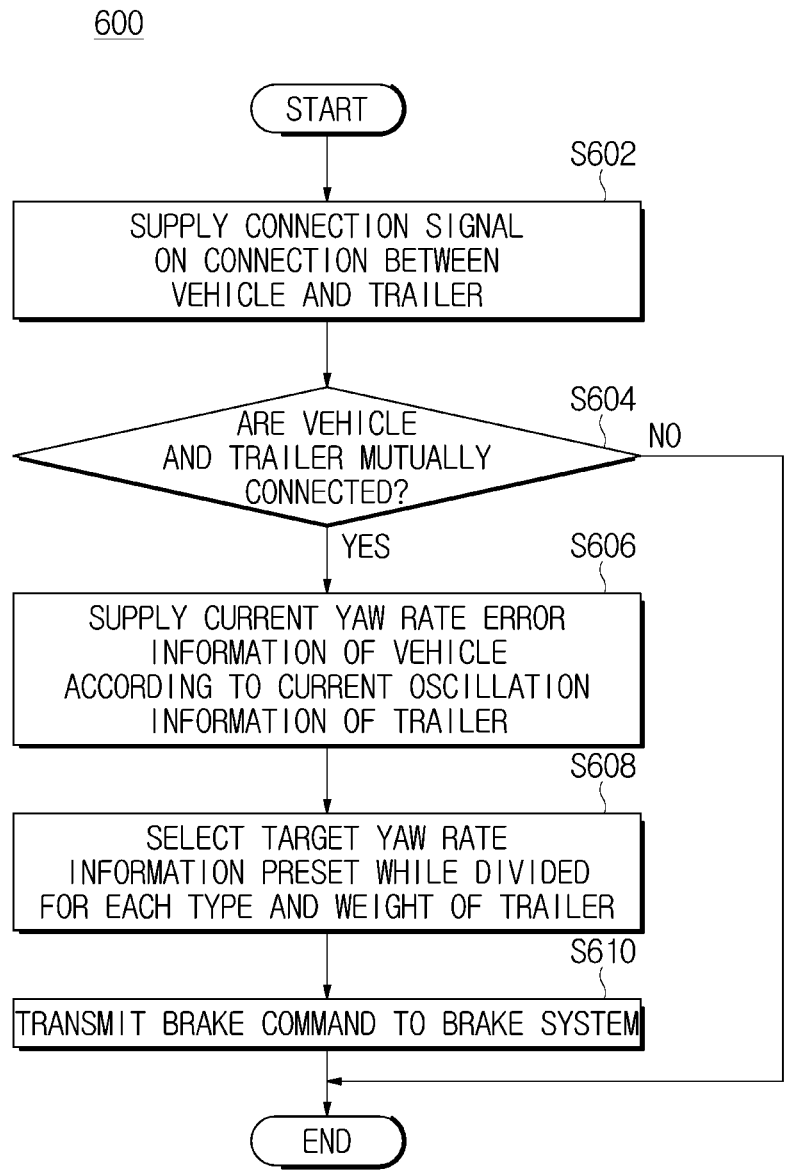
FIG. 6 is a flowchart illustrating a control method using the control apparatus in accordance with the first embodiment of the present invention.

FIG. 6 is a flowchart illustrating the control method using the control apparatus in accordance with the first embodiment of the present invention.

Referring to FIG. 6, a control method 600 using the control apparatus 100 (refer to FIGS. 1 and 2) in accordance with the first embodiment of the present invention includes a first input operation S602, a determination operation S604, a second input operation S606, a selection operation S608, and a driving operation S610.

First, the first input operation S602 receives a connection signal on a connection between a vehicle and a trailer, sensed by the sensing apparatus 10 (refer to FIG. 2), from the input unit 102 (refer to FIG. 2).

After that, in the determination operation S604, the determination unit 104 (refer to FIG. 2) determines whether the vehicle and the trailer are mutually being connected based on the connection signal on the connection between the vehicle and the trailer sensed by sensing apparatus 10.

After that, in the second input operation S606, when the determination unit 104 determines that the vehicle and the trailer are mutually connected, the current yaw rate error information D (refer to FIG. 3) of the vehicle according to current oscillation information of the trailer sensed by the sensing apparatus 10 from the input unit 102.

Here, in the second input operation S606, when the determination unit 104 determines that the vehicle and the trailer are mutually connected, the current yaw rate error information D of the vehicle according to current oscillation information of the trailer sensed by the sensing apparatus 10 may be received at the input unit 102 during a turn.

For example, in the second input operation S606, the current yaw rate error information D of the vehicle according to the current oscillation information of the trailer may be received at the input unit 102 while turning around of 100 kph 10 deg.

After that, in the selection operation S608, target yaw rate information preset while divided for each type and weight of the trailer is selected by the control unit 106 (refer to FIG. 2) according to a connection of the trailer to decrease a yaw rate error rate with respect to the current yaw rate error information D of the vehicle according to the current oscillation information of the trailer sensed by the sensing apparatus 10.

For example, the target yaw rate information may be the reference yaw rate information TY0-2, TY1-2, TY2-2, and TY3-2 (refer to FIG. 4) in comparison with the current yaw rate information TY0-1, TY1-1, TY2-1, and TY3-1 (refer to FIG. 4) for each piece of the steering information S0, S1, S2, and S3 (refer to FIG. 4) in which steering is performed according to the type and weight of the trailer.

Here, the target yaw rate information may include the reference yaw rate information TY0-2 in comparison with the current yaw rate information TY0-1 for the steering information S0 when the trailer is not mounted.

Here, current yaw rate error information TD0 may be calculated based on the current yaw rate information TY0-1 and the reference yaw rate information TY0-2.

Also, the target yaw rate information may include the reference yaw rate information TY1-2 in comparison with the current yaw rate information TY1-1 for the steering information S1 when a first trailer among trailer types is mounted in a turning situation of 100 kph 10 deg.

Here, current yaw rate error information TD1 may be calculated based on the current yaw rate information TY1-1 and the reference yaw rate information TY1-2.

Also, the target yaw rate information may include the reference yaw rate information TY2-2 in comparison with the current yaw rate information TY2-1 for the steering information S2 when the first trailer with a different weight is mounted in the turning situation of 100 kph 10 deg.

Here, current yaw rate error information TD2 may be calculated based on the current yaw rate information TY2-1 and the reference yaw rate information TY2-2.

Also, the target yaw rate information may include the reference yaw rate information TY3-2 in comparison with the current yaw rate information TY3-1 for the steering information S3 when a second trailer a type of which is different from the first trailer is mounted in the turning situation of 100 kph 10 deg.

Here, current yaw rate error information TD3 may be calculated based on the current yaw rate information TY3-1 and the reference yaw rate information TY3-2.

After that, in the driving operation S610, a brake command is transmitted from the control unit 106 to the brake system 30 (refer to FIG. 2) to brake the vehicle according to the corresponding target yaw rate information selected by the control unit 106.

Here, in the driving operation S610, when the target yaw rate information is selected by the control unit 106, the brake command is transmitted from the control unit 106 to the brake system 30 in advance to shorten the control time point t1' (refer to FIG. 5) of the brake system 30.

The control apparatus 100 of the brake system 30 and the method 600 of controlling the same in accordance with the first embodiment of the present invention, described above, includes the input unit 102, the determination unit 104, and the control unit 106 and performs the first input operation S602, the determination operation S604, the second input operation S606, the selection operation S608, and the driving operation S610.

Accordingly, since the control apparatus 100 of the brake system 30 and the method 600 of controlling the same in accordance with the first embodiment of the present invention may stably brake a vehicle according to current oscillation information of a trailer when the vehicle and the trailer turn while being mutually connected, the occurrence of traffic accidents may be prevented.

Figure 7:
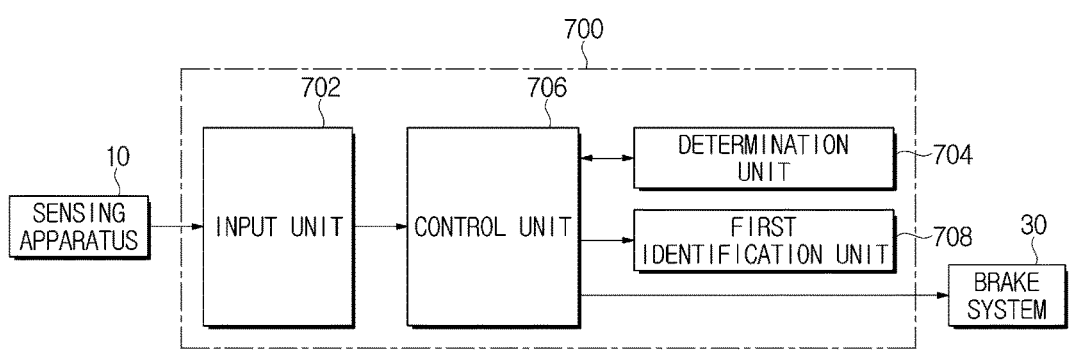
FIG. 7 is a block diagram of an example of a control apparatus in accordance with a second embodiment of the present invention.

FIG. 7 is a block diagram of an example of a control apparatus in accordance with a second embodiment of the present invention.

Referring to FIG. 7, a control apparatus 700 in accordance with a second embodiment of the present invention, like the control apparatus 100 in accordance with the first embodiment of the present invention, includes an input unit 702, a determination unit 704, and a control unit 706.

Since functions and an organic connection relationship of the input unit 702, the determination unit 704, and the control unit 706 of the control apparatus 700 in accordance with the second embodiment of the present invention, described above, are identical to functions and an organic connection relationship of the input unit 102, the determination unit 104, and the control unit 106 of the control apparatus 100 in accordance with the first embodiment of the present invention, respective additional descriptions thereof will be omitted.

Here, the control apparatus 700 in accordance with the second embodiment of the present invention further includes a first identification unit 708.

That is, when the determination unit 704 determines that a vehicle and a trailer are mutually connected under the control of the control unit 706, the first identification unit 708 allows a state in which the vehicle and the trailer are mutually connected to be identified under the control of the control unit 706.

Here, although not shown in the drawings, the first identification unit 708 may include at least one of an alarm (not shown), a speaker (not shown), and a light emitting member (not shown) provided to identify information or a state of the vehicle to allow that the vehicle and the trailer are mutually connected to be identified through at least one of a warning operation of the alarm, a voice operation of the speaker, and a light emitting operation of the light emitting member.

Also, although not shown in the drawings, the first identification unit 708 may include at least one of a human machine interface (HMI) module (not shown) and a head-up display (HUD) module (not shown) mounted to interface a user with a machine to allow a driver to recognize the information or state of the vehicle to allow that the vehicle and the trailer are mutually connected to be identified through at least one of an HMI message display operation of the HMI module and an HUD message display operation of the HUD module.

A method of controlling the brake system 30 using the control apparatus 700 in accordance with the second embodiment of the present invention described above will be described with reference to FIG. 8.

Figure 8:
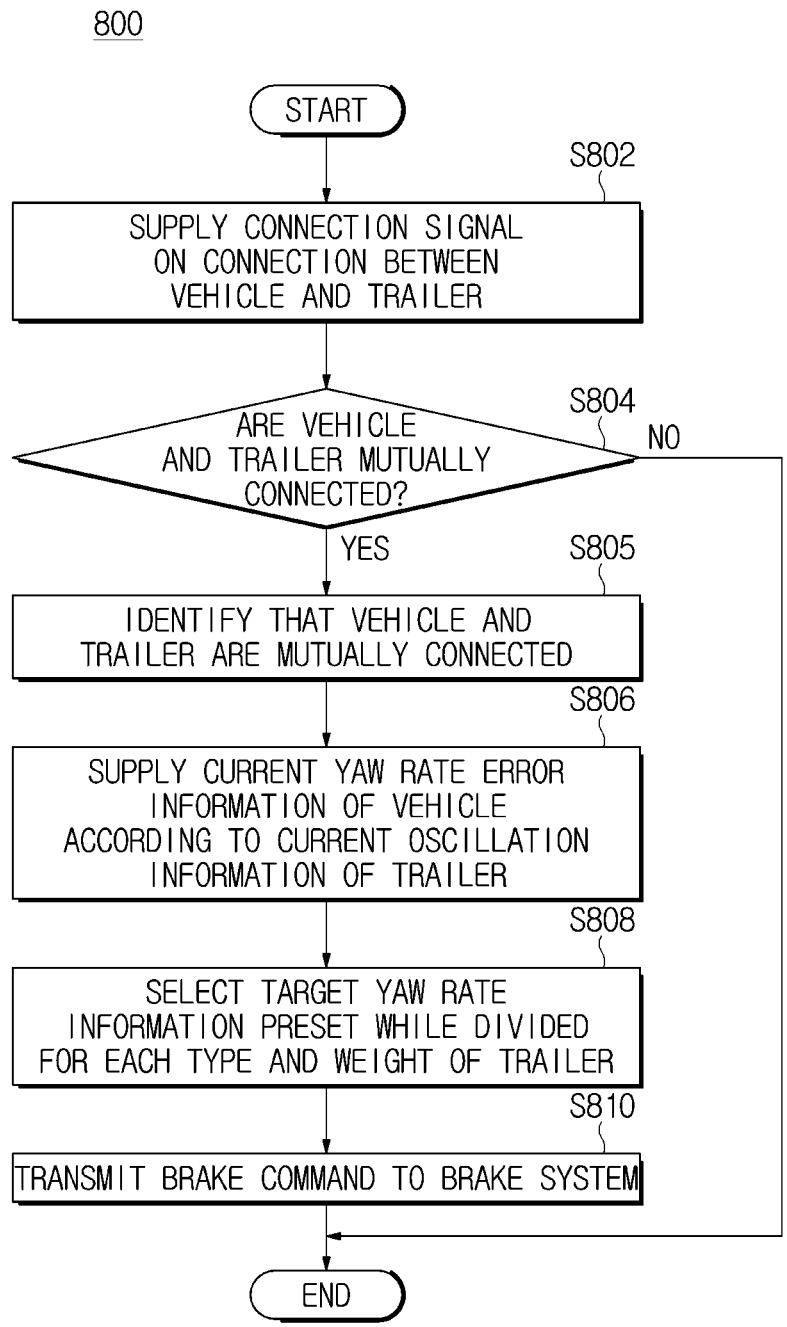
FIG. 8 is a flowchart illustrating a control method using the control apparatus in accordance with the second embodiment of the present invention.

FIG. 8 is a flowchart illustrating the control method using the control apparatus in accordance with the second embodiment of the present invention.

Referring to FIG. 8, a control method 800 using the control apparatus 700 in accordance with the second embodiment of the present invention, like the control method 600 using the control apparatus 100 in accordance with the first embodiment of the present invention, includes a first input operation S802, a determination operation S804, a second input operation S806, a selection operation S808, and a driving operation S810.

In the control method 800 using the control apparatus 700 in accordance with the second embodiment of the present invention, since functions and an organic connection relationship of the first input operation S802, the determination operation S804, the second input operation S806, the selection operation S808, and the driving operation S810 are identical to the functions and organic connection relationship of the first input operation S602, the determination operation S604, the second input operation S606, the selection operation S608, and the driving operation S610 of the control method 600 using the control apparatus 100 in accordance with the first embodiment of the present invention, respective additional descriptions thereof will be omitted.

Here, the control method 800 using the control apparatus 700 in accordance with the second embodiment of the present invention further includes a first identification operation S805.

For example, the first identification operation S805 may be performed between the determination operation S804 and the second input operation S806.

As another example, although not shown in the drawings, a first identification operation (not shown) may be performed while being synchronized with a second input operation (not shown).

That is, in the first identification operation S805, when the determination unit 704 determines that a vehicle and a trailer are mutually connected under the control of the control unit 706, the first the identification unit 708 identifies that the vehicle and the trailer are mutually connected under the control of the control unit 706.

As described above, the control apparatus 700 of the brake system 30 and the method 800 of controlling the same in accordance with the second embodiment of the present invention, described above, includes the input unit 702, the determination unit 704, and the control unit 706 and performs the first input operation S802, the determination operation S804, the first identification operation S805, the second input operation S806, the selection operation S808, and the driving operation S810.

Accordingly, since the control apparatus 700 of the brake system 30 and the method 800 of controlling the same in accordance with the second embodiment of the present invention may stably brake a vehicle according to current oscillation information of a trailer when the vehicle and the trailer turn while being mutually connected, the occurrence of traffic accidents may be prevented.

Also, the control apparatus 700 of the brake system 30 and the method 800 of controlling the same in accordance with the second embodiment may identify that the vehicle and the trailer are mutually connected.

Accordingly, in the control apparatus 700 of the brake system 30 and the method 800 of controlling the same in accordance with the second embodiment, since a driver may recognize a mounting state of the trailer, anxiety about whether the trailer is mounted may be reduced to induce driving in concentration, thereby further preventing the occurrence of traffic accidents.

Figure 9:
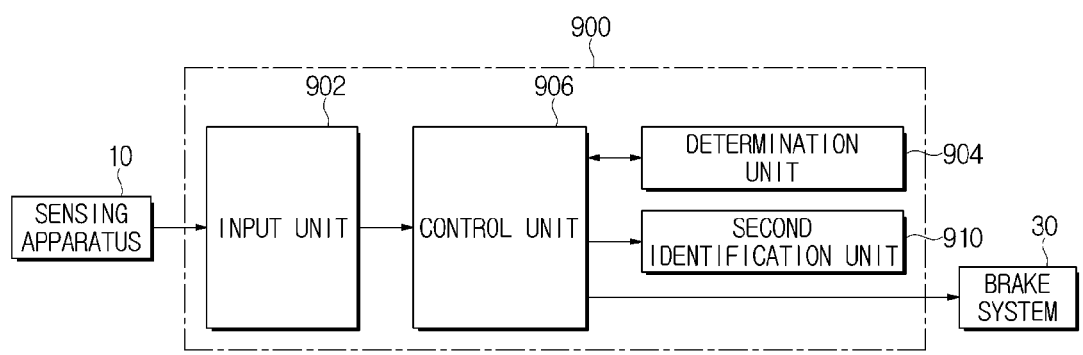
FIG. 9 is a block diagram of an example of a control apparatus in accordance with a third embodiment of the present invention.

FIG. 9 is a block diagram of a control apparatus in accordance with a third embodiment of the present invention.

Referring to FIG. 9, a control apparatus 900 in accordance with a third embodiment of the present invention, like the control apparatus 100 in accordance with the first embodiment of the present invention, includes an input unit 902, a determination unit 904, and a control unit 906.

Since functions and an organic connection relationship of the input unit 902, the determination unit 904, and the control unit 906 of the control apparatus 900 in accordance with the third embodiment of the present invention, described above, are identical to the functions and organic connection relationship of the input unit 102, the determination unit 104, and the control unit 106 of the control apparatus 100 in accordance with the first embodiment of the present invention, respective additional descriptions thereof will be omitted.

Here, the control apparatus 900 in accordance with the third embodiment of the present invention further includes a second identification unit 910.

That is, when the current yaw rate error information D of a vehicle according to current oscillation information of a trailer, sensed by the sensing apparatus 10, is received at the input unit 902, the second identification unit 910 identifies that a current yaw rate corresponds to an error situation under the control of the control unit 906.

Here, although not shown in the drawings, the second identification unit 910 includes at least one of an alarm (not shown), a speaker (not shown), and a light emitting member (not shown) provided to identify information or state of the vehicle to allow that the current yaw rate corresponds to the error situation to be identified through at least one of a warning operation of the alarm, a voice operation of the speaker, and a light emitting operation of the light emitting member.

Also, although not shown in the drawings, the second identification unit 910 may include at least one of an HMI module (not shown) and an HUD module (not shown) mounted to interface a user with a machine to allow a driver to recognize the information or state of the vehicle to allow that the current yaw rate corresponds to the error situation to be identified through at least one of an HMI message display operation of the HMI module and an HUD message display operation of the HUD module.

A method of controlling the brake system 30 using the control apparatus 900 in accordance with the third embodiment of the present invention described above will be described with reference to FIG. 10.

Figure 10:
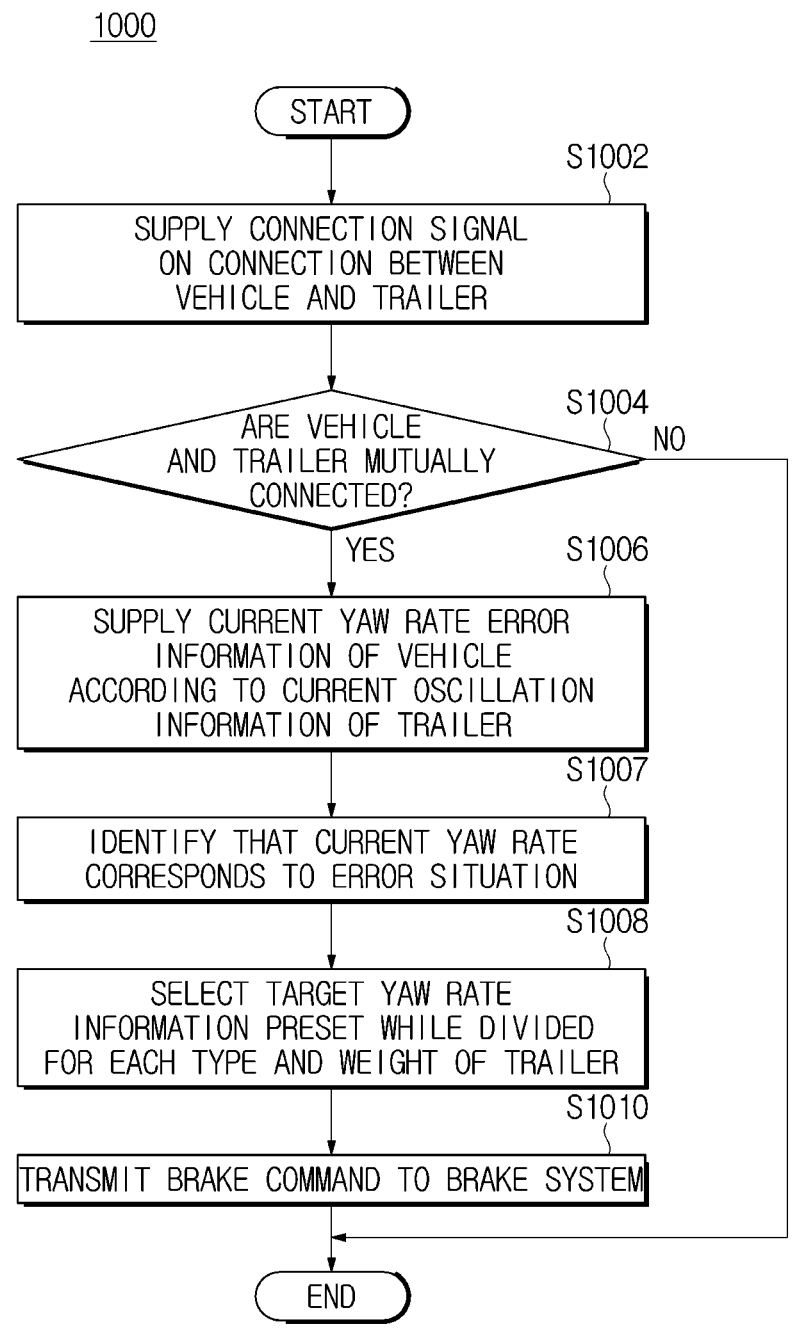
FIG. 10 is a flowchart illustrating a control method using the control apparatus in accordance with the third embodiment of the present invention.

FIG. 10 is a flowchart illustrating the control method using the control apparatus in accordance with the third embodiment of the present invention.

Referring to FIG. 10, a control method 1000 using the control apparatus 900 in accordance with the third embodiment of the present invention, like the control method 600 using the control apparatus 100 in accordance with the first embodiment of the present invention, includes a first input operation S1002, a determination operation S1004, a second input operation S1006, a selection operation S1008, and a driving operation S1010.

In the control method 1000 using the control apparatus 900 in accordance with the third embodiment of the present invention, since functions and an organic connection relationship of the first input operation S1002, the determination operation S1004, the second input operation S1006, the selection operation S1008, and the driving operation S1010 are identical to the functions and organic connection relationship of the first input operation S602, the determination operation S604, the second input operation S606, the selection operation S608, and the driving operation S610 of the control method 600 using the control apparatus 100 in accordance with the first embodiment of the present invention, respective additional descriptions thereof will be omitted.

Here, the control method 1000 using the control apparatus 900 in accordance with the third embodiment of the present invention further includes a second identification operation S1007.

For example, the second identification operation S1007 may be performed between the second input operation S1006 and the selection operation S1008.

As another example, although not shown in the drawings, a second identification operation (not shown) may be performed while being synchronized with a selection operation (not shown).

That is, in the second identification operation S1007, when the current yaw rate error information D of a vehicle according to current oscillation information of a trailer, sensed by the sensing apparatus 10, is received at the input unit 902, the second identification unit 910 identifies that a current yaw rate corresponds to an error situation under the control of the control unit 906.

As described above, the control apparatus 900 of the brake system 30 and the method 1000 of controlling the same in accordance with the third embodiment of the present invention, described above, includes the input unit 902, the determination unit 904, the control unit 906, and the second identification unit 910 and performs the first input operation S1002, the determination operation S1004, the second input operation S1006, the second identification operation S1007, the selection operation S1008, and the driving operation S1010.

Accordingly, since the control apparatus 900 of the brake system 30 and the method 1000 of controlling the same in accordance with the third embodiment of the present invention may stably brake a vehicle according to current oscillation information of a trailer when the vehicle and the trailer turn while being mutually connected, the occurrence of traffic accidents may be prevented.

Also, the control apparatus 900 of the brake system 30 and the method 1000 of controlling the same in accordance with the third embodiment may identify that a current yaw rate corresponds to an error situation.

Accordingly, in the control apparatus 900 of the brake system 30 and the method 1000 of controlling the same in accordance with the third embodiment, since a driver may recognize that the current yaw rate corresponds to the error situation, the driver may be induced to drive with caution, thereby further preventing the occurrence of traffic accidents.

Figure 11:
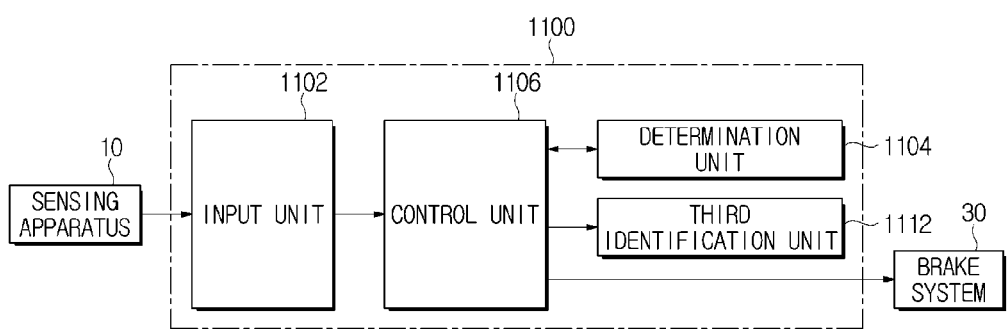
FIG. 11 is a block diagram of an example of a control apparatus in accordance with a fourth embodiment of the present invention.

FIG. 11 is a block diagram of an example of a control apparatus in accordance with a fourth embodiment of the present invention.

Referring to FIG. 11, a control apparatus 1100 in accordance with a fourth embodiment of the present invention, like the control apparatus 100 in accordance with the first embodiment of the present invention, includes an input unit 1102, a determination unit 1104, and a control unit 1106.

Since functions and an organic connection relationship of the input unit 1102, the determination unit 1104, and the control unit 1106 of the control apparatus 1100 in accordance with the fourth embodiment of the present invention, described above, are identical to the functions and organic connection relationship of the input unit 102, the determination unit 104, and the control unit 106 of the control apparatus 100 in accordance with the first embodiment of the present invention, respective additional descriptions thereof will be omitted.

Here, the control apparatus 1100 in accordance with the fourth embodiment of the present invention further includes a third identification unit 1112.

That is, when the control unit 1106 selects target yaw rate information preset while divided for each type and weight of a trailer, the third identification unit 1112 identifies a reduction of an error situation of a current yaw rate under the control of the control unit 1106.

Here, although not shown in the drawings, the third identification unit 1112 includes at least one of an alarm (not shown), a speaker (not shown), and a light emitting member (not shown) provided to identify information or state of a vehicle to allow the reduction of the error situation of the current yaw rate to be identified through at least one of a warning operation of the alarm, a voice operation of the speaker, and a light emitting operation of the light emitting member.

Also, although not shown in the drawings, the third identification unit 1112 may include at least one of an HMI module (not shown) and an HUD module (not shown) mounted to interface a user with a machine to allow a driver to recognize the information or state of the vehicle to allow the reduction of the error situation of the current yaw rate to be identified through at least one of an HMI message display operation of the HMI module and an HUD message display operation of the HUD module.

A method of controlling the brake system 30 using the control apparatus 1100 in accordance with the fourth embodiment of the present invention described above will be described with reference to FIG. 12.

Figure 12:
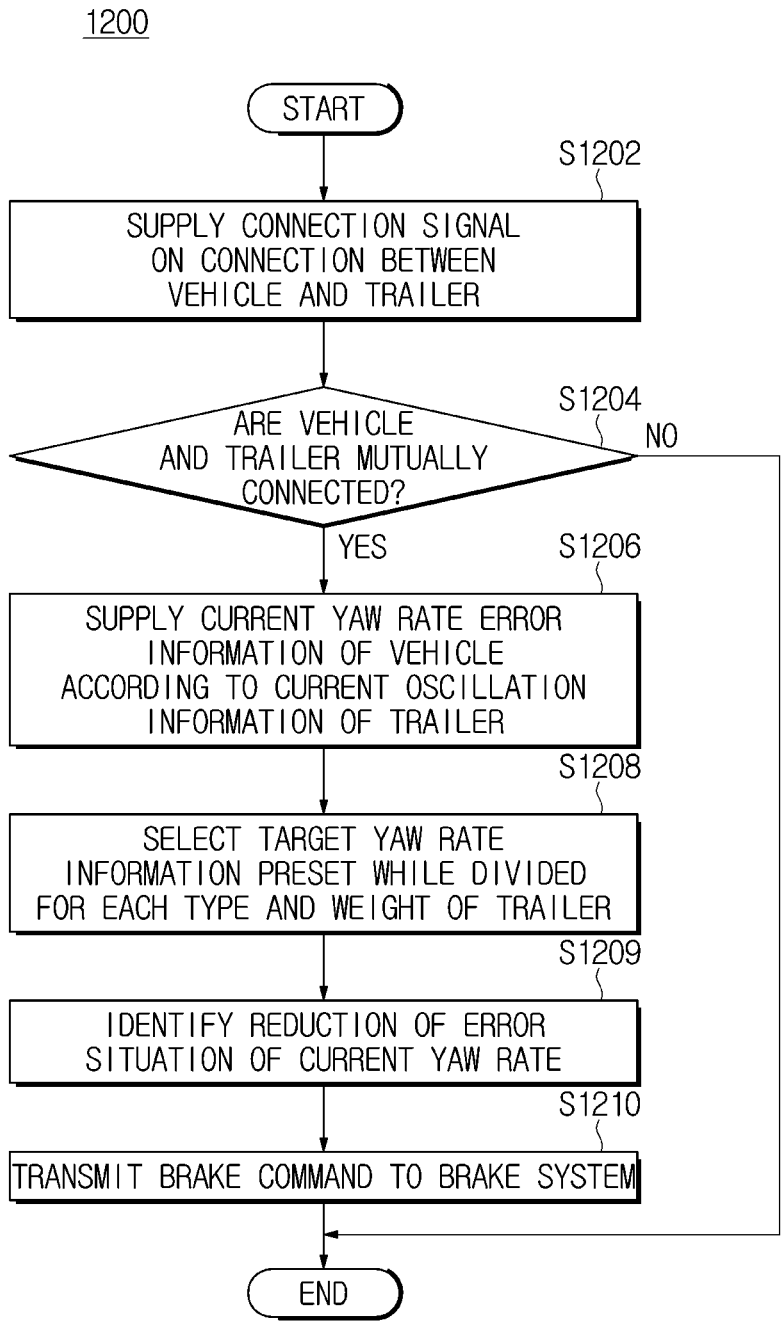
FIG. 12 is a flowchart illustrating a control method using the control apparatus in accordance with the fourth embodiment of the present invention.

FIG. 12 is a flowchart illustrating the control method using the control apparatus in accordance with the fourth embodiment of the present invention.

Referring to FIG. 12, a control method 1200 using the control apparatus 1100 in accordance with the fourth embodiment of the present invention, like the control method 600 using the control apparatus 100 in accordance with the first embodiment of the present invention, includes a first input operation S1202, a determination operation S1204, a second input operation S1206, a selection operation S1208, and a driving operation S1210.

In the control method 1200 using the control apparatus 1100 in accordance with the fourth embodiment of the present invention, since functions and an organic connection relationship of the first input operation S1202, the determination operation S1204, the second input operation S1206, the selection operation S1208, and the driving operation S1210 are identical to the functions and organic connection relationship of the first input operation S602, the determination operation S604, the second input operation S606, the selection operation S608, and the driving operation S610 of the control method 600 using the control apparatus 100 in accordance with the first embodiment of the present invention, respective additional descriptions thereof will be omitted.

Here, the control method 1200 using the control apparatus 1100 in accordance with the fourth embodiment of the present invention further includes a third identification operation S1209.

For example, the third identification operation S1209 may be performed between the selection operation S1208 and the driving operation S1210.

As another example, although not shown in the drawings, a third identification operation (not shown) may be performed while being synchronized with a driving operation (not shown).

That is, in the third identification operation S1209, when the control unit 1106 selects target yaw rate information preset while divided for each type and weight of a trailer, the third identification unit 1112 identifies a reduction of an error situation of a current yaw rate under the control of the third identification unit 1112.

As described above, the control apparatus 1100 of the brake system 30 and the method 1200 of controlling the same in accordance with the fourth embodiment of the present invention, described above, includes the input unit 1102, the determination unit 1104, the control unit 1106, and the third identification unit 1112 and performs the first input operation S1202, the determination operation S1204, the second input operation S1206, the selection operation S1208, the third identification operation S1209, and the driving operation S1210.

Accordingly, since the control apparatus 1100 of the brake system 30 and the method 1200 of controlling the same in accordance with the fourth embodiment of the present invention may stably brake a vehicle according to current oscillation information of a trailer when the vehicle and the trailer turn while being mutually connected, the occurrence of traffic accidents may be prevented.

Also, the control apparatus 1100 of the brake system 30 and the method 1200 of controlling the same in accordance with the fourth embodiment may identify a reduction of the error situation of the current yaw rate.

Accordingly, in the control apparatus 1100 of the brake system 30 and the method 1200 of controlling the same in accordance with the fourth embodiment, since a driver may recognize the reduction of the error situation of the current yaw rate, the driver may be induced to drive with caution, thereby further preventing the occurrence of traffic accidents.

Figure 13:
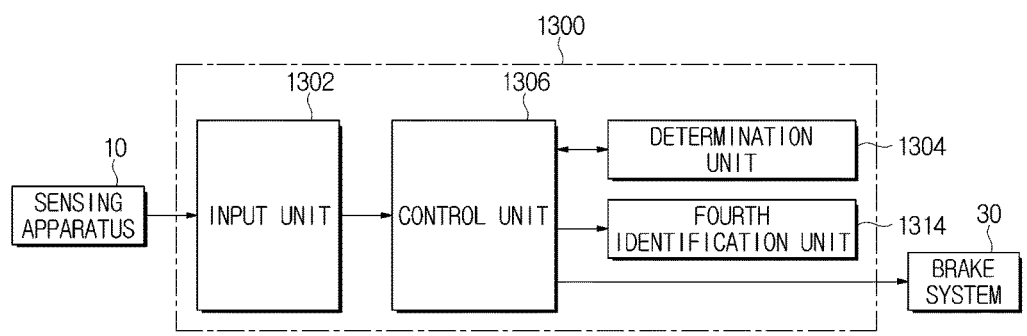
FIG. 13 is a block diagram of an example of a control apparatus in accordance with a fifth embodiment of the present invention.

FIG. 13 is a block diagram of an example of a control apparatus in accordance with a fifth embodiment of the present invention.

Referring to FIG. 13, a control apparatus 1300 in accordance with a fifth embodiment of the present invention, like the control apparatus 100 in accordance with the first embodiment of the present invention, includes an input unit 1302, a determination unit 1304, and a control unit 1306.

Since functions and an organic connection relationship of the input unit 1302, the determination unit 1304, and the control unit 1306 of the control apparatus 1300 in accordance with the fifth embodiment of the present invention, described above, are identical to the functions and organic connection relationship of the input unit 102, the determination unit 104, and the control unit 106 of the control apparatus 100 in accordance with the first embodiment of the present invention, respective additional descriptions thereof will be omitted.

Here, the control apparatus 1300 in accordance with the fifth embodiment of the present invention further includes a fourth identification unit 1314.

That is, when the control unit 1306 transmits a brake command to the brake system 30, the fourth identification unit 1314 identifies that a vehicle is braked while reducing an error situation of a current yaw rate under the control of the control unit 1306.

Here, although not shown in the drawings, the fourth identification unit 1314 includes at least one of an alarm (not shown), a speaker (not shown), and a light emitting member (not shown) provided to identify information or state of a vehicle to allow that the vehicle is braked while reducing the error situation of the current yaw rate to be identified through at least one of a warning operation of the alarm, a voice operation of the speaker, and a light emitting operation of the light emitting member.

Also, although not shown in the drawings, the fourth identification unit 1314 may include at least one of an HMI module (not shown) and an HUD module (not shown) mounted to interface a user with a machine to allow a driver to recognize the information or state of the vehicle to allow that the vehicle is braked while reducing the error situation of the current yaw rate to be identified through at least one of an HMI message display operation of the HMI module and an HUD message display operation of the HUD module.

A method of controlling the brake system 30 using the control apparatus 1300 in accordance with the fifth embodiment of the present invention described above will be described with reference to FIG. 14.

Figure 14:
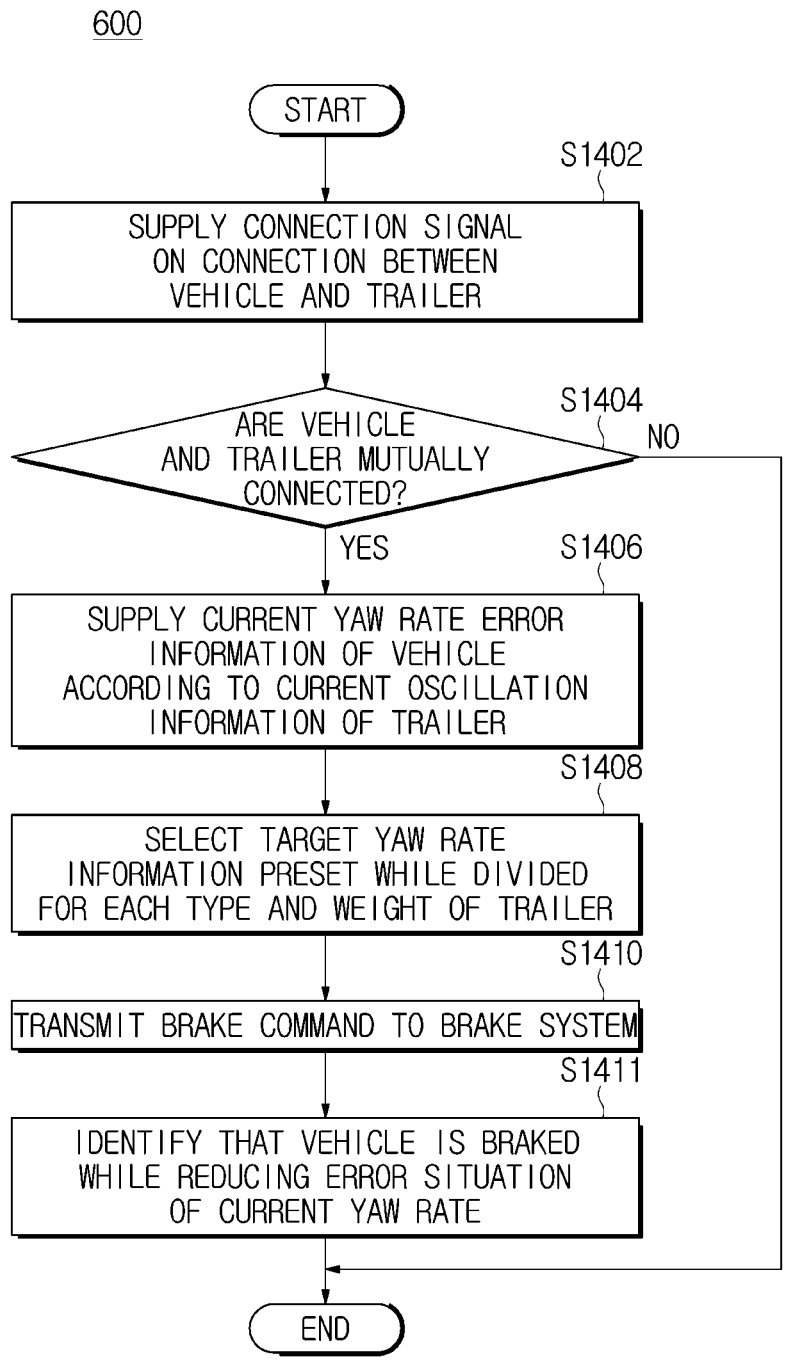
FIG. 14 is a flowchart illustrating a control method using the control apparatus in accordance with the fifth embodiment of the present invention.

FIG. 14 is a flowchart illustrating a control method using the control apparatus in accordance with the fifth embodiment of the present invention.

Referring to FIG. 14, a control method 1400 using the control apparatus 1300 in accordance with the fifth embodiment of the present invention, like the control method 600 using the control apparatus 100 in accordance with the first embodiment of the present invention, includes a first input operation S1402, a determination operation S1404, a second input operation S1406, a selection operation S1408, and a driving operation S1410.

In the control method 1400 using the control apparatus 1300 in accordance with the fifth embodiment of the present invention, since functions and an organic connection relationship of the first input operation S1402, the determination operation S1404, the second input operation S1406, the selection operation S1408, and the driving operation S1410 are identical to the functions and organic connection relationship of the first input operation S602, the determination operation S604, the second input operation S606, the selection operation S608, and the driving operation S610 of the control method 600 using the control apparatus 100 in accordance with the first embodiment of the present invention, respective additional descriptions thereof will be omitted.

Here, the control method 1400 using the control apparatus 1300 in accordance with the fifth embodiment of the present invention further includes a fourth identification operation S1411.

For example, the fourth identification operation S1411 may be performed after the driving operation S1410.

As another example, although not shown in the drawings, a fourth identification operation (not shown) may be performed while being synchronized with a driving operation (not shown).

That is, in the fourth identification operation S1411, when the control unit 1306 transmits a brake command to the brake system 30, the fourth identification unit 1314 identifies that a vehicle is braked while reducing an error situation of a current yaw rate under to the control of the control unit 1306.

As described above, the control apparatus 1300 of the brake system 30 and the method 1400 of controlling the same in accordance with the fifth embodiment of the present invention, described above, includes the input unit 1302, the determination unit 1304, the control unit 1306, and the fourth identification unit 1314 and performs the first input operation S1402, the determination operation S1404, the second input operation S1406, the selection operation S1408, the driving operation S1410, and the fourth identification operation S1411.

Accordingly, since the control apparatus 1300 of the brake system 30 and the method 1400 of controlling the same in accordance with the fifth embodiment of the present invention may stably brake a vehicle according to current oscillation information of a trailer when the vehicle and the trailer turn while being mutually connected, the occurrence of traffic accidents may be prevented.

Also, the control apparatus 1300 of the brake system 30 and the method 1400 of controlling the same in accordance with the fifth embodiment may identify that the vehicle is braked while reducing the error situation of the current yaw rate.

Accordingly, in the control apparatus 1300 of the brake system 30 and the method 1400 of controlling the same in accordance with the fifth embodiment, since a driver may recognize that the vehicle is braked while reducing of the error situation of the current yaw rate, the driver may be induced to drive with caution while reducing anxiety about the braking of the vehicle, thereby further preventing the occurrence of traffic accidents.

As apparent from the above description, a control apparatus of a brake system and a method of controlling the same in accordance with one embodiment of the present invention may prevent the occurrence of traffic accidents.

Also, a control apparatus of a brake system and a method of controlling the same in accordance with one embodiment of the present invention may further prevent the occurrence of traffic accidents by inducing driving in concentration.

Also, a control apparatus of a brake system and a method of controlling the same in accordance with one embodiment of the present invention may further prevent the occurrence of traffic accidents by inducing driving with caution.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control apparatus of a brake system, comprising:
    an input unit which receives a connection signal on a connection between a vehicle and a trailer sensed by a sensing apparatus and receives current yaw rate error information of the vehicle according to current oscillation information of the trailer sensed by the sensing apparatus;
    a determination unit which determines whether the vehicle and the trailer are mutually connected based on the connection signal; and
    a control unit, when the vehicle and the trailer are mutually connected, which selects target yaw rate information preset while being divided for each type and weight of the trailer depending on the connection of the trailer to reduce a yaw rate error rate with respect to the current yaw rate error information of the vehicle according to the current oscillation information and transmits a brake command to the brake system to brake the vehicle according to the selected corresponding target yaw rate information.

2. The control apparatus of claim 1, wherein the control unit, when the target yaw rate information is selected, transmits the brake command to the brake system in advance to shorten a control time point of the brake system.

3. The control apparatus of claim 1, wherein the input unit receives the current yaw rate error information of the vehicle according to the current oscillation information of the trailer when the vehicle and the trailer turn.

4. The control apparatus of claim 1, further comprising a first identification unit which identifies that the vehicle and the trailer are mutually connected.

5. The control apparatus of claim 1, further comprising an image photographing unit which photographs a rear of the vehicle,
    wherein when the trailer is photographed by the image photographing unit, the determination unit determines that the vehicle and the trailer are mutually connected.

6. The control apparatus of claim 1, further comprising a second identification unit which identifies that a current yaw rate corresponds to an error situation when the current yaw rate error information of the vehicle according to the current oscillation information of the trailer is received.

7. The control apparatus of claim 1, further comprising a third identification unit which identifies a reduction of an error situation of a current yaw rate when the target yaw rate information is selected.

8. The control apparatus of claim 1, further comprising a fourth identification unit which identifies that the vehicle is braked while reducing an error situation of a current yaw rate when the brake command is transmitted to the brake system.

9. A method of controlling a brake system, comprising:
 a first input operation of receiving a connection signal on a connection between a vehicle and a trailer sensed by a sensing apparatus;
 a determination operation of determining whether the vehicle and the trailer are mutually connected based on the connection signal;
 a second input operation of receiving current yaw rate error information of the vehicle according to current oscillation information of the trailer sensed by the sensing apparatus when the vehicle and the trailer are mutually connected;
 a selection operation of selecting target yaw rate information preset while being divided for each type and weight of the trailer depending on the connection of the trailer to reduce a yaw rate error rate with respect to the current yaw rate error information of the vehicle according to the current oscillation information; and
 a driving operation of transmitting a brake command to the brake system to brake the vehicle according to the selected corresponding target yaw rate information.

10. The method of claim 9, wherein when the target yaw rate information is selected, the driving operation comprises transmitting the brake command to the brake system in advance to shorten a control time point of the brake system.

11. The method of claim 9, wherein the second input operation comprises receiving the current yaw rate error information of the vehicle according to the current oscillation information of the trailer when the vehicle and the trailer turn.

12. The method of claim 9, further comprising a first identification operation of identifying that the vehicle and the trailer are mutually connected when the vehicle and the trailer are mutually connected.

13. The method of claim 9, further comprising a second identification operation of identifying that a current yaw rate corresponds to an error situation when the current yaw rate error information of the vehicle according to the current oscillation information of the trailer is received.

14. The method of claim 9, further comprising a third identification operation of identifying a reduction of an error situation of a current yaw rate when the target yaw rate information is selected.

15. The method of claim 9, further comprising a fourth identification operation of identifying that the vehicle is braked while reducing an error situation of a current yaw rate when the brake command is transmitted to the brake system.

16. The method of claim 9, further comprising photographing a rear of the vehicle,
 wherein when the trailer is photographed, it is determined that the vehicle and the trailer are mutually connected.

* * * * *